United States Patent Office 3,598,654
Patented Aug. 10, 1971

3,598,654
SOLID STATE BATTERY WITH SOLID ELECTROLYTE
Wayne Richard Hruden, 175 Tecumseh Ave. West,
Windsor, Ontario, Canada
No Drawing. Filed June 4, 1968, Ser. No. 734,254
Int. Cl. H01m 11/00
U.S. Cl. 136—83R                                   1 Claim

ABSTRACT OF THE DISCLOSURE

Compounds capable of ionic conduction (ionophores) having the form $M_2AgI_3$ where M is a univalent electropositive element or radical used in solid state electrochemical devices such as batteries.

BACKGROUND OF THE INVENTION

Field of the invention

The invention relates to ionophores which are compounds capable of ionic conduction. It refers more specifically to the family of compounds having the general form $M_2AgI_3$ (where M is an electropositive metal or radical having an oxidation number of +1) and the use of these compounds in solid state electrochemical devices.

Description of the prior art

Several ionophores or solid electrolytes have been found in the past, but have disadvantages not found in the presently disclosed family of compounds. Summarized in the table below are the previously utilized compounds.

| | | Example | |
|---|---|---|---|
| No. | Ionophore category, compound family | Name | Specific resistivity (approximate ohm-cm.) |
| 1 | AgX (X=Cl, Br or I) | Silver chloride | 2×10 |
| 2 | AgX+Y (Y=Te or Cd) | Silver chloride plus tellurium. | 7×10 |
| 3 | $Ag_3SX$ | Triargentous thioiodide. | $10^2$ |
| 4 | $MAg_4I_5$ (M=K, Rb or $NH_4$). | Potassium tetrargentous pentiodide. | 8 |

Note.—Where X=Cl but may be Br or I with appropriate name change; Y=Te but may be Cd with appropriate name change; M=K but may be Rb or $NH_4$ with appropriate name change.

In the above table, the members of categories Nos. (1) and (2) are shown to have very high specific resistivities. Compound family (3) has a relatively high electronic conductance component. The members of (4) are generally thermodynamically unstable. Thus, ionophores that have been previously described, are generally not entirely adequate for most electrochemical applications.

In contrast to this, it has been discovered by the inventor, that compounds of the family $M_2AgI_3$ have relatively low specific resistivities, show essentially no electronic conductance component and are substantially stable at the usual ambient temperatures.

SUMMARY OF THE INVENTION

One of the objects of the invention is to provide improved ionophonic compounds for use in solid state electrical devices having the form $M_2AgI_3$. Another object is to provide a new use for compounds having the form $M_2AgI_3$, as for example an electrolyte or a cathode material in an electrochemical energy producing cell.

DESCRIPTION OF THE PREFERRED EMBODIMENTS

Although any member of the family of compounds having the form $M_2AgI_3$ has the above described advantages, for the purposes of the present specific disclosure, $K_2AgI_3$ (Dipotassium Argentous Triiodide) will be employed as a representative member. All of the members of the family and specifically Rb, $C_s$ and $NH_4$ should be directly substitutable for K in the rest of the disclosure with appropriate change in the names the compounds formed and with comparable results. Rb and $NH_4$ have been so substituted in the examples indicated hereinafter.

As with its related compounds of the family, dipotassium argentous triiodide is orthorhombic and may conveniently be prepared from aqueous solution in accordance with the reaction:

$$2KI + AgI \rightarrow K_2AgI_3$$

This compound has been found to have a specific ionic resistivity of around 37 ohm-cm.

In the preparation of this compound two moles of KI are dissolved in the minimum amount of water to give a saturated solution. The solution is then warmed to approximately 80° centigrade and one mole of AgI is dissolved in the KI solution with stirring. The $K_2AgI_3$ is then obtained by crystallization.

Several solid state electrochemical energy-producing cells have been prepared by employing an anode of powdered silver pressed into a pellet, an electrolyte of dipotassium argentous triiodide, similarly in the form of a pellet and a pelletized cathode having the following composition:

| | Percent |
|---|---|
| $RbI_3$ | 50 |
| Acetylene black carbon | 25 |
| $K_2AgI_3$ | 25 |

These cells were capable of delivering 1 ma./cm.$^2$ with an electromotive force of 0.65 volt.

The solid state cells were produced by placing the anode and cathode pellets on opposite sides of a pellet of $K_2AgI_3$ electrolyte. The sandwich assembly thus formed was held together under sufficient pressure to assure adequate electrical contact between the pellets.

While several embodiments and modifications of the invention have been considered herein, it will be understood that other modifications and embodiments thereof are contemplated by the inventor. It is the intention to include all modifications and embodiments defined by the appended claims within the scope of the invention.

I claim:
1. A solid state electrochemical energy producing cell consisting of an anode of powdered silver pressed into a pellet, a cathode comprising a reducible compound comprising a mixture of 50% $RbI_3$, 25% Acetylene Black Carbon, and 25% $M_2AgI_3$, where M is selected from the group consisting of K, Rb, $C_sNH_4$, pressed into a pellet, and a solid electrolyte consisting of an ionically conductive compound having the formula $M_2AgI_3$ where M is selected from the group consisting of K, Rb, $C_sNH_4$ pressed into a pellet and placed between and in contact with the anode and cathode so as to form a sandwich assembly, said assembly being held together under sufficient pressure to assure adequate electrical contact between the pellets.

References Cited

UNITED STATES PATENTS

| 3,170,817 | 2/1965 | Mrgudich | 136—83 |
| 3,375,135 | 3/1968 | Moulton et al. | 136—6 |
| 3,443,997 | 5/1969 | Argue et al. | 136—83 |

WINSTON A. DOUGLAS, Primary Examiner

C. F. LEFEVOUR, Assistant Examiner

U.S. Cl. X.R.

136—153